US010540546B2

(12) United States Patent
Kusakabe

(10) Patent No.: US 10,540,546 B2
(45) Date of Patent: Jan. 21, 2020

(54) IMAGE PROCESSING APPARATUS, CONTROL METHOD, AND STORAGE MEDIUM

(71) Applicant: CANON KABUSHIKI KAISHA, Tokyo (JP)

(72) Inventor: Minoru Kusakabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 15/838,964

(22) Filed: Dec. 12, 2017

(65) Prior Publication Data

US 2018/0165515 A1 Jun. 14, 2018

(30) Foreign Application Priority Data

Dec. 13, 2016 (JP) ................................ 2016-241597

(51) Int. Cl.
*G06K 9/00* (2006.01)
*G06T 7/00* (2017.01)
*G06K 9/62* (2006.01)

(52) U.S. Cl.
CPC ........ *G06K 9/00369* (2013.01); *G06T 7/0002* (2013.01); *G06K 9/6201* (2013.01); *G06T 2207/20076* (2013.01)

(58) Field of Classification Search
CPC .......... G06K 9/00369; G06K 9/00771; G06K 9/00362
See application file for complete search history.

(56) References Cited

U.S. PATENT DOCUMENTS

2012/0020519 A1* 1/2012 Yashiro .............. G06K 9/00369
382/103
2012/0114177 A1* 5/2012 Adachi .............. G06K 9/00362
382/103

FOREIGN PATENT DOCUMENTS

JP 2013-093639 A 5/2013

* cited by examiner

*Primary Examiner* — Ross Varndell
(74) *Attorney, Agent, or Firm* — Carter, DeLuca & Farrell LLP

(57) ABSTRACT

An image processing apparatus for reducing an influence of a false detection from processing for detecting a predetermined object, and a control method thereof are provided. An image processing apparatus, comprising: a detecting unit for detecting a region of a predetermined object from an image; a determining unit for determining whether the detection by the detecting unit is a false detection; a processing unit for performing processing relating to the predetermined object on the region detected by the detecting unit; and a controlling unit for controlling, based on a determination result by the determining unit, execution of the processing by the processing unit on the region detected by the detecting unit.

12 Claims, 6 Drawing Sheets

IMAGE PROCESSING APPARATUS, CONTROL METHOD, AND STORAGE MEDIUM

BACKGROUND

Field

The present invention relates to an image processing technique for suppressing a false detection when detecting a predetermined object in an image, which is a technique for removing a region detected by a false detection determination function from an analysis region.

Description of the Related Art

Techniques for detecting a person appearing in a captured image are being put to practical use. Application to various uses are considered for this type of technique. For example, because it is possible to count a number of people from a captured image, application to marketing by ascertaining a number of visitors in a store or the like, or application to city planning by ascertaining an amount of traffic on a road or the like can be considered.

In a technique for detecting a person, while it can be said that precision of the detection is improving, generally it is difficult to completely suppress false detections. Japanese Patent Laid-Open No. 2013-93639 recites a configuration for suppressing false detections by a user confirming a false detection by visual observation, and designating a location where a false detection is occurring.

SUMMARY

According to one aspect of the present invention, there is provided an image processing apparatus, comprising: a detecting unit configured to detect a region of a predetermined object from an image; a determining unit configured to determine whether the detection by the detecting unit is a false detection; a processing unit configured to perform processing relating to the predetermined object on the region detected by the detecting unit; and a controlling unit configured to control, based on a determination result by the determining unit, execution of the processing by the processing unit on the region detected by the detecting unit.

Further features of the present invention will become apparent from the following description of exemplary embodiments (with reference to the attached drawings).

DESCRIPTION OF THE EMBODIMENTS

Explanation of a suitable embodiment of the present invention is given below with reference to the attached drawings.

Figure 1:
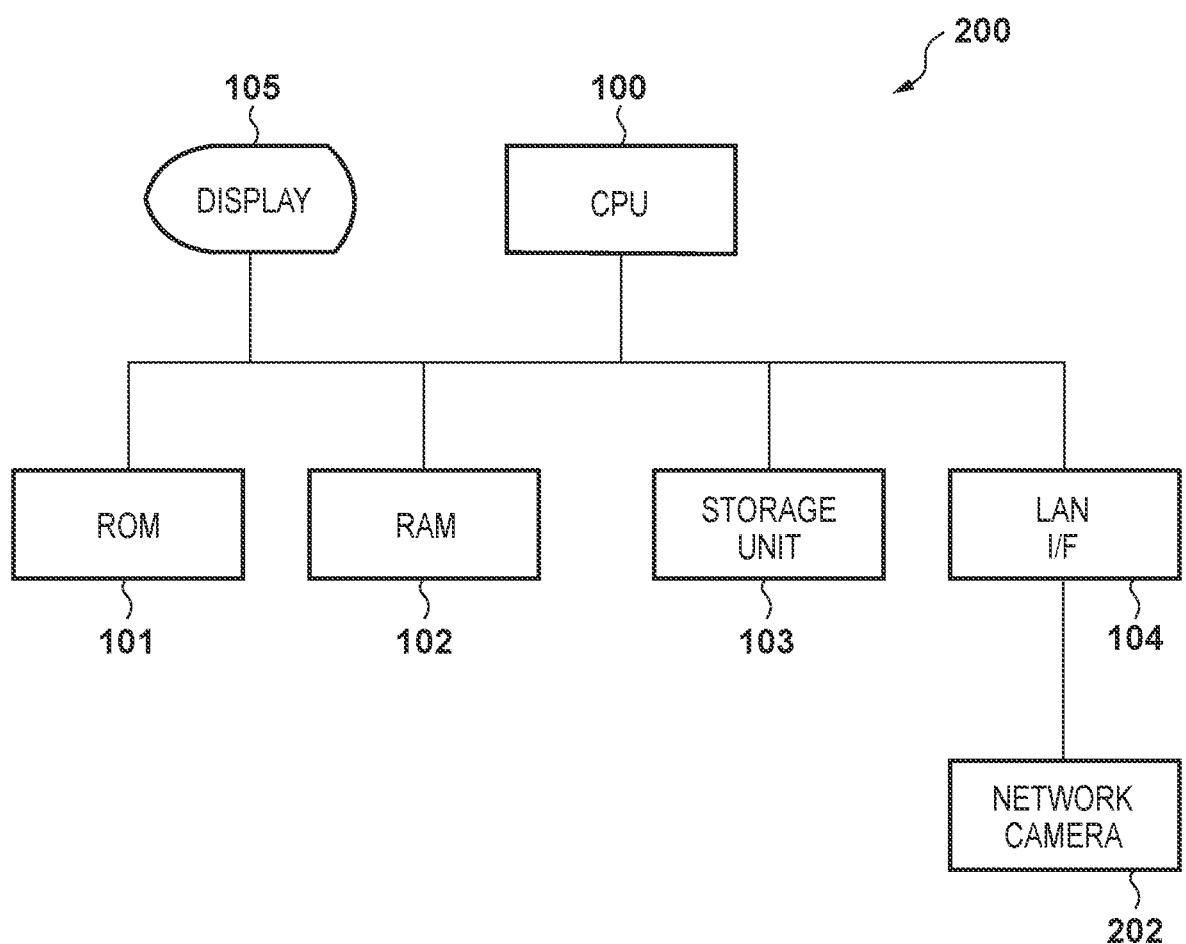
FIG. 1 is a block diagram that illustrates a hardware configuration of an image processing apparatus.

FIG. 1 is a block diagram that illustrates an example of a hardware configuration of an image processing apparatus 200. It is possible to use a general-purpose computer, for example, as the image processing apparatus 200. In FIG. 1, a CPU 100 is a processor that executes various processing by executing a program stored in a ROM 101 and/or a RAM 102. The ROM 101 is a non-volatile read-only memory, and stores a program or the like. The RAM 102 is a memory that is capable of reading/writing at any time, and temporarily stores a program, image data, or the like. A storage unit 103 operates as a secondary storage apparatus for storing a program, image data, or the like. A hard disk drive (HDD), a solid state drive (SSD), or the like, for example, are used as a storage medium for the storage unit 103. A LAN interface 104 performs communication with a network camera, another computer, or the like. FIG. 1 illustrates a situation in which a network camera 202 is connected to the LAN interface 104. A display 105 performs various displays under control by the CPU 100.

Figure 2:
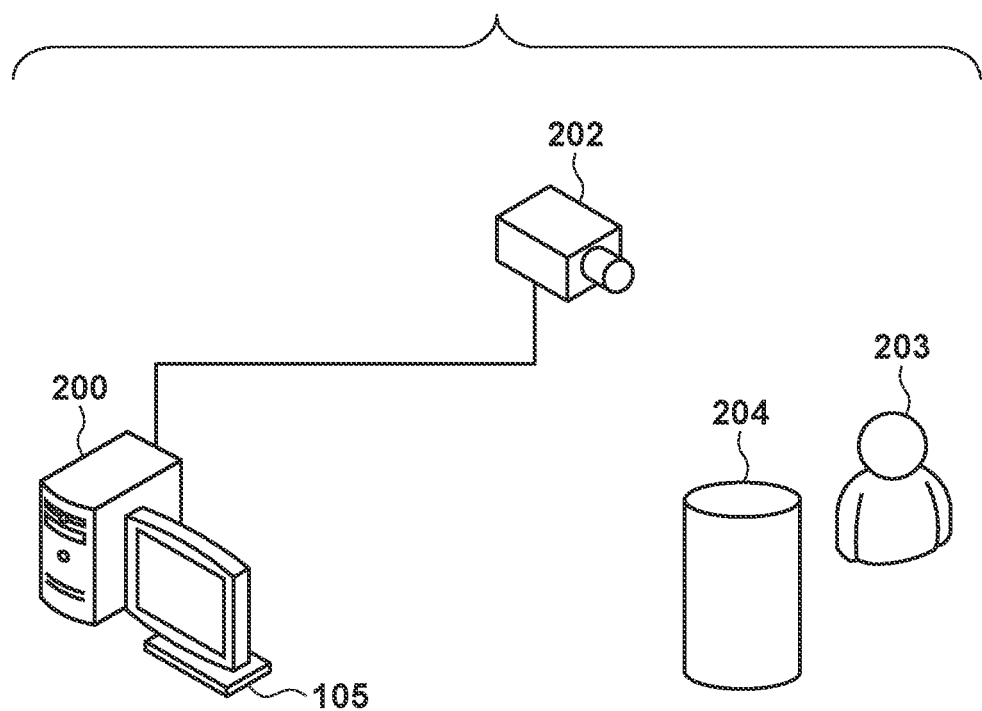
FIG. 2 is a view for explaining an application example of the image processing apparatus.

FIG. 2 is a view that illustrates an example of a configuration of an image processing system that includes the image processing apparatus 200. In FIG. 2, the network camera 202 captures within an imaging area, and transmits an image to the image processing apparatus 200 via a network. In the example of FIG. 2, a person 203 that is an object and a physical object 204 that is not a person are present within the imaging area of the network camera 202. In such a case, the person 203 and the physical object 204 appear as objects in an image captured by the network camera 202. In the present embodiment, the physical object 204 is a physical object that is falsely detected as a person when person detection processing is performed.

Note that, in the configuration of FIG. 2, the network camera 202 is illustrated as an example of a device that transmits an image to the image processing apparatus 200, but the present embodiment is not limited to this. For example, configuration may be taken such that a captured image is temporarily stored in a storage device of another computer, and subsequently transmitted to the image processing apparatus 200 by the other computer. In addition, in the present embodiment, illustration is given of a configuration in which the image processing apparatus 200 and the network camera 202 (a device that transmits an image) are connected via a network such as a LAN, but there is no limitation to this. For example, there may be a configuration in which a digital camera (a digital still camera or a digital video camera) and the image processing apparatus 200 are connected by USB, and an image is transmitted from the digital camera to the image processing apparatus 200 via USB.

Figure 3:
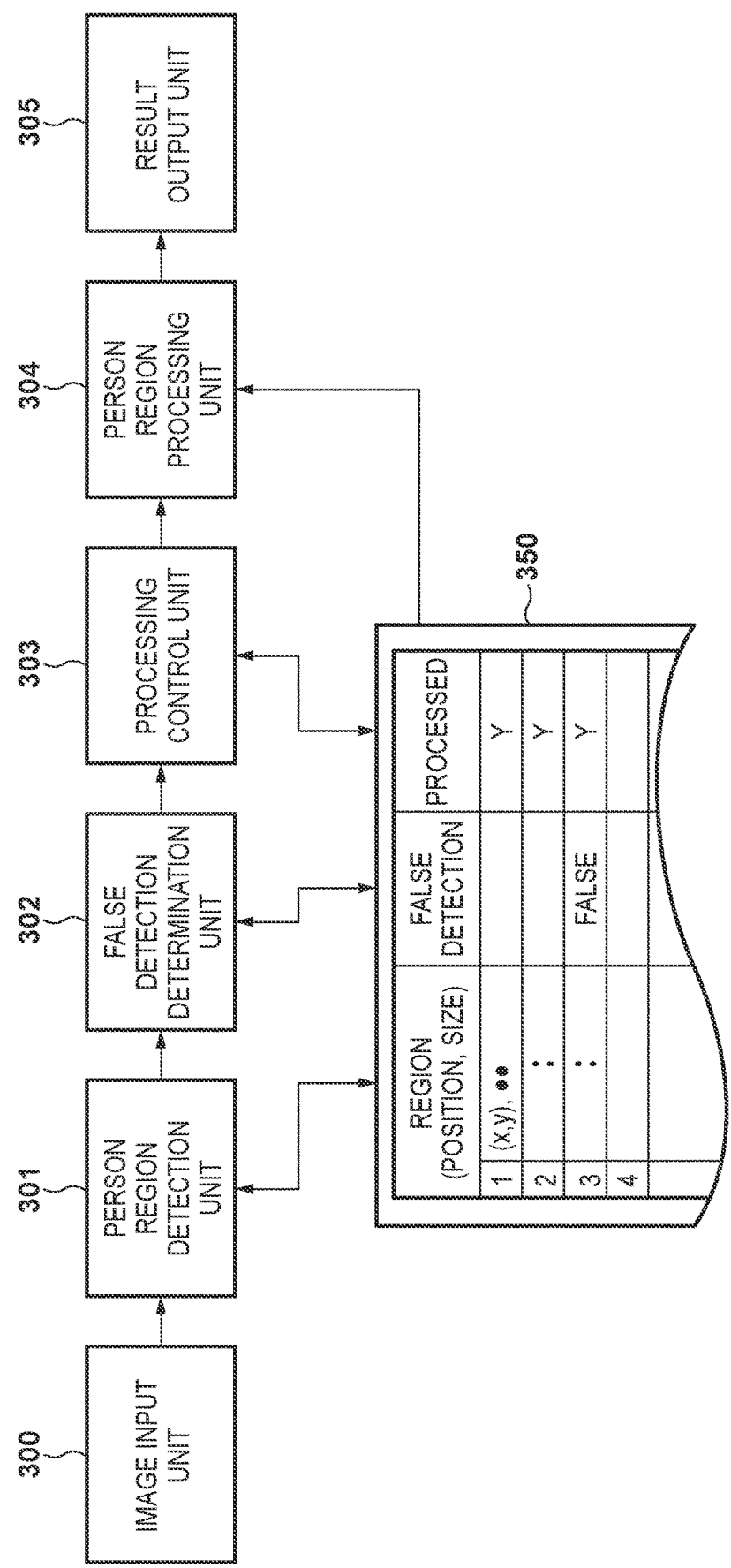
FIG. 3 is a block diagram that illustrates a functional configuration of the image processing apparatus.

FIG. 3 is a block diagram for illustrating an example of a functional configuration of the image processing apparatus 200. Note that each functional block explained below may be realized by the CPU 100 executing a program, or some or all of the functional blocks may be realized by dedicated hardware.

In FIG. 3, an image input unit 300 inputs an image from the network camera 202. The image input unit 300 consecutively inputs an image frame as a moving image, for example. A person region detection unit 301 is an example of a detecting unit for detecting a region of a predetermined object, and detects a person region from an image inputted by the image input unit 300. The person region detection unit 301 detects a region in which a person is appearing, for example in which the whole body, an upper half body, a face, or a head of a person is appearing. Note that details of a person detected by the person region detection unit 301 are decided in advance in accordance with a processing algorithm or the like, and detection that includes a head, a face, or the like, may be performed in order to count a number of people, for example. In addition, in the present embodiment, the type of an object that is a detection target is given as a person, but there is no limitation to this, and a specific type of object that is not a person, such as an automobile for example, may be set as a detection target.

A false detection determination unit 302 is an example of a determining unit for performing a false detection determination with respect to a detected region, and determines whether a person region detected by the person region detection unit 301 is a false detection. Processing for determining a false detection by the false detection determination unit 302 is described later. Note that, in the present embodiment, the person region detection unit 301 registers a position and size of a person region detected from an image in a list 350. For each region registered in the list 350 (a region detected as a person region), the false detection determination unit 302 determines whether it is a false detection, and registers a determination result thereof in the list 350.

A processing control unit 303 is an example of a controlling unit for controlling execution of processing (processing related to an object) with respect to each region, based on the false detection determination result for each region detected from the image. In the present embodiment, the processing control unit 303 controls execution of processing by a person region processing unit 304 with respect to a person region detected by the person region detection unit 301, based on the determination result by the false detection determination unit 302. The person region processing unit 304 is an example of a processing unit for performing processing related to a predetermined object (a person in the present embodiment) with respect to a region detected from an image. The person region processing unit 304 performs predetermined processing with respect to a person region detected in the person region detection unit 301, in accordance with control by the processing control unit 303. As an example of processing executed by the person region processing unit 304, processing for counting a number of people detected, for example, may be given. In addition, as examples of processing executed by the person region processing unit 304, for example, in accordance with performing additional analysis processing with respect to a person region detected in the person region detection unit 301, the following may be given:

processing for estimating an age, a gender, or the like of a person;

person authentication for determining whether a person has been registered beforehand;

person tracking processing which uses a plurality of frames of a moving image; or processing for estimating a direction of movement of a person. In addition, the various processing described above that can be applied to a person region may be executed independently, or may be executed after combining a plurality of processing.

A result output unit 305 outputs a processing result by the person region processing unit 304 for usage by another application that the CPU 100 executes, for example.

Figure 4:
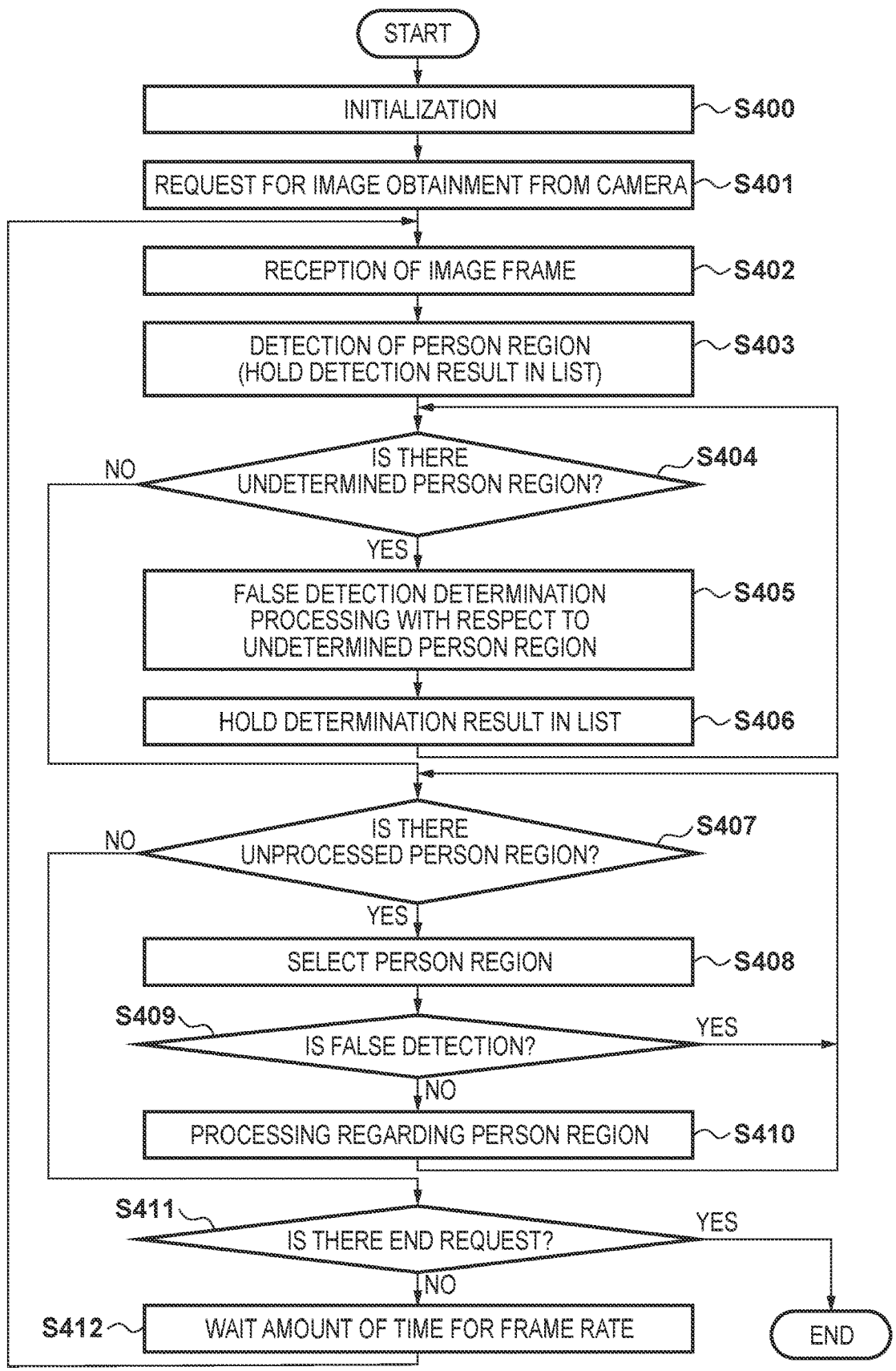
FIG. 4 is a flowchart for illustrating operation by the image processing apparatus.

FIG. 4 is a flowchart for illustrating an example of processing by the image processing apparatus 200. Processing illustrated in FIG. 4 is realized by the CPU 100 executing a program stored in the ROM 101 or the RAM 102, for example.

When this processing is initiated, in step S400, the CPU 100 performs initialization necessary for the processing. In step S401, the CPU 100 performs an obtainment request (an image obtainment request) for an image frame with respect to the network camera 202, and initiates obtainment of a captured image. In step S402, the image input unit 300 receives an image frame of a moving image captured by the network camera 202. In step S403, the person region detection unit 301 detects a person region from the image frame received in step S402. Here, in a case where a store, a road, or the like is captured by the network camera 202, there may be a case in which a plurality of person regions are detected. To manage a plurality of person regions, information of the person regions (a position, size, range, or the like of a person) obtained as a result of detection processing is held in the list 350 and managed. In addition, it is possible to manage other information (for example, a false detection determination result), which is related to each person region and is described later, together with this information in the list 350.

In step S404 through in step S406, the false detection determination unit 302 performs false detection determination processing with regard to each person region registered in the list 350, and registers a determination result thereof in the list 350. Firstly, in step S404, the false detection determination unit 302 determines, in regard to a person region that was detected in the image frame (a person region registered in the list 350), whether it is a region for which processing for determining whether it is a false detection is yet to be executed (an undetermined person region). If there is an undetermined person region, in step S405, the false detection determination unit 302 executes, with respect to the undetermined person region, later-described processing for determining whether it is a false detection. In step S406, the false detection determination unit 302 holds the determination result of step S405 in association with the person region in the list 350. The above processing of step S405 through step S406 is repeated until all of the person regions registered in the list 350 have been subject to the false detection determination processing (step S404).

When the false detection determination processing has been executed for all of the person regions registered in the list 350, the processing indicated by step S407 through step S410 is executed. In step S407 through step S410, the processing control unit 303 causes the person region processing unit 304 to process person regions not determined as false detections, out of the person regions registered in the list 350.

Firstly, in step S407, the processing control unit 303 determines whether there is a person region, out of the person regions registered in the list 350, for which processing with respect to the person region is yet to be performed. If there is a person region for which processing with respect to the person region is yet to be performed, in step S408, the processing control unit 303 selects one person region for which processing is yet to be performed. At this point, for the selected person region, it is recorded in the list 350 that it has been processed. Next, in step S409, the processing control unit 303 refers to a false detection determination result for the person region selected in step S408 to determine whether the selected person region is a false detection. When the person region is determined not to be a false detection, in step S410, the processing control unit 303 causes the person region processing unit 304 to perform processing with respect to the person region. Meanwhile, when the person region is determined to be a false detection in step S408, the processing returns to step S407.

When it is determined in step S407 that there is no unprocessed person region, in step S411, the CPU 100 determines the existence or absence of a processing end request, and causes the processing to end if there is an end request. Meanwhile, when it is determined in step S411 that there is no end request, in step S412, the CPU 100 returns the processing to step S402 after waiting an amount of time for the frame rate of the moving image. Note that, when the timing of image transmission/reception for each frame is performed on an image transmission side such as a camera, step S412 is unnecessary. In this case, configuration may be taken to have waiting until an image is received and the waiting to determine the end of step S411 in step S402.

In addition, in the flowchart of FIG. 4, configuration may be taken to have the reception of an image frame in step S402 be the reception of a plurality of images that are transmitted from a plurality of cameras. Alternatively, configuration may be taken to, when PTZ (pan, tilt, zoom) can be changed in a network camera, causing an automatic cycle, and receiving images from a plurality of differing image capture positions that are captured. In such a case, configuration may be taken such that the processing of step S404 and step S409 is performed on all received image frames, and processing is performed with respect all person regions detected in all image frames.

In addition, although the determination of step S404 is performed with respect to all of the regions detected in step S403 in the flowchart of FIG. 4, configuration may be taken so that it is only executed only for regions included in an area designated in advance. Such a method is useful in a case where a location in an imaging area of a camera where a false detection is likely to occur is specified, and can allow for optimization of processing.

In addition, in the flowchart illustrated in FIG. 4, the processing of step S410 (the processing by the person region processing unit 304) was not executed on a person region determined as a false detection in step S409, but there is no limitation to this. For example, configuration may be taken such that there is a plurality of processing with respect to a person region in step S410, and to change processing in accordance with a false detection determination result. Furthermore, in this case, configuration may be taken such that an output result of the false detection determination processing of step S405 is stored as a value indicating a level (having three or more values) instead of a binary value for the existence or absence of a false detection, and the processing content is changed in accordance with this value. In this way, when there are three or more types of processing for step S410, support as necessary is possible. One concrete example is a method in which, in addition to breaking the determination as whether or not there is a false detection into three stages by determining the value indicating the level using predetermined thresholds, a display is changed after determining that an intermediary cannot be determined. In this manner, for example, in a case of counting a number of people, by performing two types of counts: a count having a high reliability that an object is a person and a count that includes results where a determination cannot be made, it is possible to implement counting such that an upper limit and a lower limit that are obtained considering error are easy to grasp.

In addition, configuration is made such that, in step S406, a false detection determination result is held in association with a person region detected in step S403, but the present embodiment is not limited to this. For example, configuration may be taken to exclude a person region determined as a false detection in step S405 from a detection list, instead of saving the determination result. In this way, because processing the same as the determination of whether the region is a false detection in step S409 is executed in step S406, processing is reduced. In addition, as another example in which a false detection determination result is not held, a method in which the processing of step S409 and step S410 is performed immediately after the processing of step S405 may be given.

Next, explanation is given regarding the false detection determination method in accordance with the false detection determination unit 302, of step S405. In the present embodiment, because a person is set as a detection target, determination is made as to whether an object in a region is a person. Various algorithms have been proposed for a method of detecting a person region. For example, a method for extracting a contour and performing pattern matching with a contour template of a head that is held in advance may be given. In such a case, there is a possibility that something that matches with the pattern by chance would cause a false detection of a person region to occur even when it is not a person. For example, when a very complex design or crowded small physical objects are an object, there is a possibility of such a coincidental match occurring.

Meanwhile, when a person is captured, there is a feature that a skin color region extends in the face of a person over a predetermined range, for example. In addition, there is a tendency for the face or head of a person to have a feature that a similar color extends over a predetermined range, such as, in the case of a head, a feature where the color of the hair extends over a predetermined range. Accordingly, as a suitable example for the false detection determination method of step S405, configuration is taken to detect the color of a detected person region, and determine whether the person region is a false detection in accordance with a color distribution (for example, a histogram). As a concrete example of this processing, configuration may be taken to determine whether the region includes many color components of ranges that have a low probability of appearing as skin. As an example of simpler processing, because skin color has a feature in that there is a low probably of a lot of blue or green components appearing independently, configuration may be taken to have a method for determining a false detection if a predetermined amount of blue or green components are independently detected. In addition, configuration may be taken to use a skin color component chosen considering the influence of a light source as a determination criterion in a case where illumination in a capturing environment is not a white light source and it is known beforehand that the illumination has a particular color. Note that a determination method for performing a false detection determination based on a color of a detected region is not limited to the examples described above, and various other methods can be applied.

Furthermore, in addition to color, for example, because there are predetermined number of flat regions in a person image, there is a method for detecting the flatness of a region detected as a person. As an example of false detection determination processing based on the flatness of an image of a detected region, various methods can be applied, such as a determination of the state of an edge by an edge detection filter, or a state of a high-frequency component that uses a frequency characteristic. Furthermore, in the case of a moving image, it is possible to make a determination by obtaining differences between frames, for example a difference with a previous frame, and a method that simply determines a false detection for a person region detected for a region where there is no difference, for example, may be given.

As described above, configuration may be taken to apply a condition having a high probability for a false detection to the processing of step S405. In this way, it is possible to suppress false detections by unified criteria in a case where a plurality of kinds of person region detection processing having differing performance are performed, or a case where person region detection processing is performed with respect to an image that captures a plurality of objects having differing tendencies for false detection to occur. As a result, it is possible to perform processing that takes advantage of person detection results that have a unified false detection rate.

In addition, as a suitable example of processing that takes advantage of a person detection result (the output of the result output unit 305) in the present embodiment, statistical processing may be given. As a detailed example of statistical processing, a heat map that holds a count for a number of people, a count of a number of people by age or gender in consideration of a result of person attribute estimation processing, or a ratio at which a person was stopped at a specific position, or the like may be given. In addition, the present embodiment is not limited to the aforementioned examples, and can be applied to various uses.

As explained above, by the configuration described above, in a case where person region detection processing is performed, it is possible to suppress a false detection rate without needing a designation by an operator when a false detection occurs. In particular, the configuration can be applied to a person detection result that guarantees a certain performance by suppressing a false detection rate in accordance with a capturing environment or an image capturing condition, or by suppressing false detections by unified criteria in a case where a plurality of person region detection processes having differing performance are applied.

Next, explanation is given for an example of a case in which another false detection determination method is used. In this determination method, a person region detected from an image that is captured in a predetermined period is recorded as a false detection region, and whether or not a person region detected from an image that is captured outside of the predetermined period is a false detection is determined based on the recorded false detection region. This is something that takes advantage of, for example in a store having a closing time, a person region detected after the closing time has a high probability of being considered to be a false detection as a determination criterion for a false detection. While a false detection determination result with respect to the current frame is used for control of processing with respect to a person region in the current frame in the method of FIG. 4, in FIGS. 5 and 6, a false detection result that is detected at a different time is used in control of processing with respect to a person region in the current frame. Note that the hardware configuration and of the image processing apparatus 200 the configuration of the image processing system are similar to that in FIG. 1 and FIG. 2.

Figure 5:
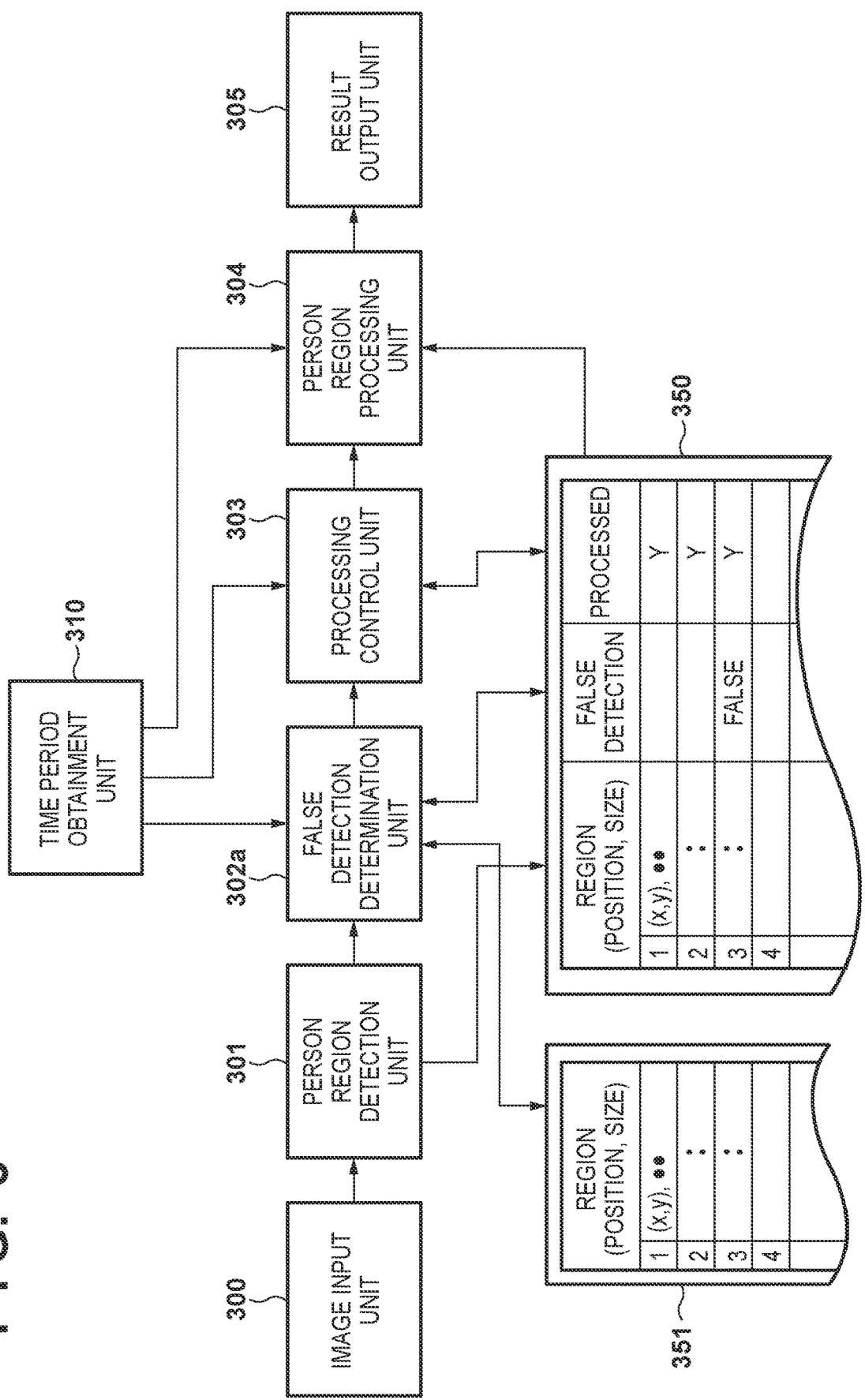
FIG. 5 is a block diagram that illustrates an example of a functional configuration of the image processing apparatus.

FIG. 5 is a functional block diagram of the image processing apparatus 200. The same reference numerals are added to functional blocks that are the same as functional blocks illustrated in FIG. 3. In FIG. 5, a time period obtaining unit 310 obtains a time designation that indicates a period (a false detection determination time period) for determining a detected person region as a false detection, and notifies the time designation to a false detection determination unit 302a. The false detection determination unit 302a registers a person region detected by the person region detection unit 301 in the false detection determination time period to a false detection list 351. While the list 350 described above by FIG. 3 is valid for one image frame, the false detection list 351 is maintained across a predetermined period (for example, until a subsequent false detection determination time period is initiated) in which a region is determined to be a false detection. The false detection determination unit 302a refers to the false detection list 351 to perform a false detection determination for a person region detected from an image obtained at a time other than a false detection determination time period obtained by the time period obtaining unit 310. Explanation is given below regarding operation of the image processing apparatus 200 in accordance with the flowchart of FIG. 6.

Figure 6:
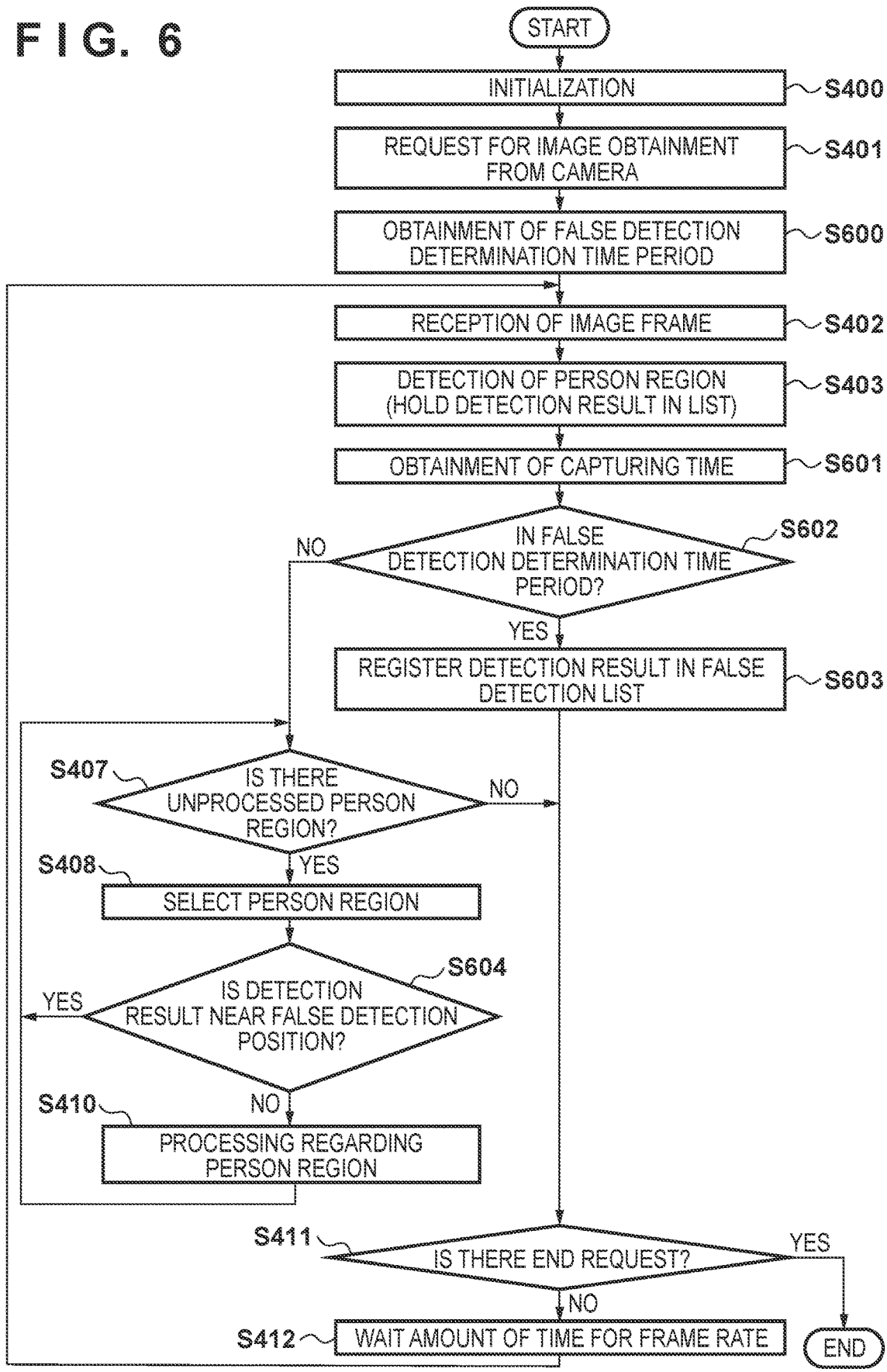
FIG. 6 is a flowchart for illustrating operation by the image processing apparatus.

FIG. 6 is a flowchart that illustrates processing by the image processing apparatus 200, and is executed by the CPU 100 which is illustrated in FIG. 1, for example. Note that the same reference numerals are added to steps for performing processing that are similar to those in FIG. 4, and a detailed explanation thereof is omitted.

When processing is initiated, the CPU 100 performs initialization, and makes an image obtainment request with respect to the network camera 202 (step S400 and step S401). In step S600, the time period obtaining unit 310 obtains a period (the false detection determination time period) in which a detected person region is determined to be a false detection. The false detection determination time period can be input with an appropriate time period in accordance with an application environment by an operator, and the time period obtaining unit 310 obtains this inputted time period. Note that it is desirable to set a time band in which a person normally does not appear as the false detection determination time period. For example, it is possible to set the false detection determination time period by designating a time period such as outside the opening hours of a store or outside work hours for an office in the form of an initiation time and an ending time. In step S600, designation of the false detection determination time period by an operator in this way is obtained by the time period obtaining unit 310.

Subsequently, the image input unit 300 receives an image frame of a moving image captured by the network camera 202, and the person region detection unit 301 detects person regions from the received image frame and registers them in the list 350 (step S402 and step S403).

Next, in step S601, the false detection determination unit 302a obtains the timing when the image frame received in step S402 was captured. Note that there are cases where the capturing time of each frame of the moving image is stored in a header portion or the like of the image data. In such a case, because the capturing time is obtained when an image frame is received, step S601 can be treated as being included in step S402. In step S602, the false detection determination unit 302a determines whether the capturing time obtained in step S601 is during the false detection determination time period obtained in step S600. If the capturing time is determined to be during the false detection determination time period, in step S603, the false detection determination unit 302a registers the person region detected in step S403 in the false detection list 351 as a false detection region for which a false detection has occurred. The processing of step S411 and step S412 is then performed. The processing of step S411 and step S412 is the same as that in FIG. 4.

Meanwhile, when it is determined in step S602 that the capturing time is not in the false detection determination time period, the processing transitions to step S407. In the processing of step S407, step S408, step S604, and step S410, the person region processing unit 304 performs processing for a person region determined to not be a false detection by the false detection determination unit 302a, from among person regions detected by the person region detection unit 301. Note that the person regions detected by the person region detection unit 301 are recorded in the list 350.

Firstly, in step S407, the false detection determination unit 302a determines whether there is a person region in the list 350 that is yet to be processed. When it is determined that there is an unprocessed person region, in step S408, the false detection determination unit 302a selects one unprocessed person region. For the selected person region, "Y" is recorded in the "processed" column of the list 350. In step S604, the false detection determination unit 302a determines whether the person region selected in step S408 is a false detection in accordance with whether the person region is near a position of a false detection region recorded in the false detection list 351. If the detection position of the selected person region is near the detection position of any false detection region recorded in the false detection list 351, the person region is determined to be a false detection. Note that whether the detection position is near a false detection region can be determined in accordance with whether a distance between the detection position and the false detection region exceeds a predetermined value, for example. In addition, as a determination condition for whether or not there is a false detection, configuration may be such that the size of a detected region is taken as a condition, in addition to a distance condition. For example, that a difference (ratio) between the size of a detected person region and the size of a region recorded in the false detection list 351 is within a predetermined range may be used as a condition. When the selected person region is determined to be a false detection in step S604, the processing control unit 303 does not cause the person region processing unit 304 to process the person region. Accordingly, the processing simply returns to step S407. When the selected person region is determined not to be a false detection in step S604, in step S410, the processing control unit 303 causes the person region processing unit 304 to process the selected person region.

Note that the time period obtained in in step S600 may be the designation of an initiation time and an execution period instead of an initiation time and an ending time. Alternatively, an initiation time and a number of image frames on which to perform processing may be used. Alternatively, configuration may be taken to have a period or a number of image frames for which to perform processing as a predetermined value that is decided in advance, and obtain only an initiation time.

In addition, configuration may be taken to use the current time in the image processing apparatus 200 instead of the capturing time which is obtained in step S601. In this case, a region detected by the person region detection unit 301 while the current time is during the false detection determination time period is recorded in the false detection list 351 as a false detection region. In this way, it is possible to handle a case where information regarding the capturing time is not sent from the network camera 202, a case where an obtained capturing time is clearly anomalous in comparison to the current time in the image processing apparatus 200, or the like.

Although description above was given of an example where all detected regions are treated as false detections in the processing of step S603, configuration may be taken such that a determination is made by a result of a combination with the false detection determination processing explained in step S405 of FIG. 4. The false detection determination time period is on principle a time band where people are not present, and there are few detected person regions therein. In addition, processing related to a person region (step S410) cannot be performed in the false detection determination time period. Accordingly, in step S603, because it is possible to devote more time to the false detection determination processing, application of high precision determination processing is possible.

In addition, in the example described above, determination of whether a person region is a false detection is made in the processing of step S604, but there is no limitation to this. Configuration may be taken to use three or more values for a detection determination result, similarly to the processing of step S409 of FIG. 4, and change processing content relating to a person region in step S410 in accordance with the determination result for false detection.

As explained above, by the configuration of FIG. 5 and FIG. 6 described above, it is possible to suppress a false detection rate to within a predetermined level, even in a case where a cause for the occurrence of a false detection cannot be predicted and without requiring a designation by an operator at the time of the occurrence of a false detection that occurs as a result. In other words, it is possible to suppress the influence of a false detection from processing for detecting a person region, without involving a person's hand. In addition, when there are a plurality of the person region detection unit 301, the false detection determination unit 302 is capable of unified standard for suppression. In other words, when performing person detection processing, it is possible to suppress, by a unified standard, a situation where the occurrence of false detections differs for each system of detection processing or each measurement environment. As a result, it is possible to suppress variation due to false detection by a processing result that uses a person detection processing result.

In addition, configuration may be taken such that results of the false detection determination processing by step S405 of FIG. 4 are recorded and held in the false detection list 351, and the false detection list is referred to in the false detection determination of step S409. In this way, in a time band where there is the possibility that a person will enter an imaging area such as in a store, for example, it is possible to suppress a false detection when a false detection occurs such as due to the addition or replenishment of a product. Note that the false detection list may be reset at a predetermined interval (for example, once a day, once a week, or the like).

In the foregoing explanation, a configuration realized by a software program operated by the image processing apparatus 200 illustrated in FIG. 2 was given, but there is no limitation to this. For example, a method for realizing the foregoing processing by embedded software processing or hardware processing in the network camera 202 may be given. Alternatively, configuration may be taken to have a system configuration for performing distributed processing that is not limited to processing in a single device, such as by performing a portion of the foregoing processing by the network camera 202 and performing the remaining processing by the image processing apparatus 200. An example of distributed processing may be to perform the processing of step S403, which is person region detection processing, by the network camera 202, and execute false detection determination processing (step S405) and processing to make a registration to the false detection list (step S603) by the image processing apparatus 200. In addition, person region detection processing may be executed by the network camera 202 and the image processing apparatus 200, or may be executed by a plurality of computers apart from the network camera 202. In addition, the false detection determination processing may be applied to an output result of an application that has a plurality of person region detection functions that are executed in the same computer.

As described above, it is possible to suppress false detections by a unified standard, even when performance of the person region detection processing of step S403 differs for each camera or application due to the processing being distributed over a plurality of apparatuses, or when differing targets are captured. Accordingly, it is possible to suppress variation between cameras of the results of step S410, which is processing that takes advantage of a detected person region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-241597, filed Dec. 13, 2016 which is hereby incorporated by reference herein in its entirety.

What is claimed is:

1. An image processing apparatus comprising a computer including instructions that, when executed by the computer, cause the computer to function as:
a detecting unit configured to detect a predetermined object from an image captured by an imaging unit;
a determining unit configured to determine whether a time when the image is captured by the imaging unit is included in a set period; and
a controlling unit configured to control execution of processing relating to the predetermined object detected by the detecting unit,
wherein if the determining unit determines that a time when a first image is captured by the imaging unit is included in the set period and the detecting unit detects the predetermined object from the first image, the controlling unit controls, based on a position of the predetermined object detected from the first image, the execution of the processing relating to the predetermined object detected from a second image captured by the imaging unit within a period different from the set period.

2. The apparatus according to claim 1, wherein the detecting unit detects a person as the predetermined object.

3. The apparatus according to claim 1, further comprising a setting unit configured to set the set period based on user instruction.

4. The apparatus according to claim 1,
wherein
if the determining unit determines that the time when the first image is captured by the imaging unit is included in the set period and the detecting unit detects the predetermined object from the first image, the controlling unit controls the execution of the processing relating to the predetermined object detected in the second image, based on the position of the predetermined object detected in the first image and a position of the predetermined object detected in the second image.

5. The apparatus according to claim 4, wherein the controlling unit changes processing content of the processing related to the predetermined object detected in the second image, in accordance with a distance between the position of the predetermined object detected in the first image and the position of the predetermined object detected in the second image.

6. The apparatus according to claim 4, wherein the controlling unit determines that the processing related to the predetermined object detected in the second image is performed, if a distance between the position of the predetermined object detected in the first image and the position of the predetermined object detected in the second image is greater than a predetermined value.

7. The apparatus according to claim 1, further comprising a processing unit configured to perform the processing relating to the predetermined object.

8. The apparatus according to claim 1, wherein the processing relating to the predetermined object is counting processing of counting the predetermined object detected by the detecting unit in the image.

9. The apparatus according to claim 1,
wherein the detecting unit detects a person as the predetermined object, and
wherein the processing relating to the predetermined object is estimating processing of estimating an age or a gender of the person detected by the detecting unit in the image.

10. A control method of an image processing apparatus, the method comprising:
detecting a predetermined object from an image captured by an imaging unit;
determining whether a time when the image is captured by the imaging unit is included in a set period; and
controlling execution of processing relating to the predetermined object detected in the detecting,
wherein if a time when a first image is captured by the imaging unit is included in the set period and the predetermined object is detected from the first image, the execution of the processing relating to the predetermined object detected from a second image captured by the imaging unit within a period different from the set period is controlled based on a position of the predetermined object detected from the first image.

11. A non-transitory computer-readable storage medium storing a program for causing a computer to execute a method, the method comprising:
   detecting a predetermined object from an image captured by an imaging unit;
   determining whether a time when the image is captured by the imaging unit is included in a set period; and
   controlling execution of processing relating to the predetermined object detected in the detecting,
   wherein if a time when a first image is captured by the imaging unit is included in the set period and the predetermined object is detected from the first image, the execution of the processing relating to the predetermined object detected from a second image captured by the imaging unit within a period different from the set period is controlled based on a position of the predetermined object detected from the first image.

12. An image processing system in which a camera and a computer apparatus are connected, wherein
   the camera comprises a first computer including first instructions that, when executed by the first computer, cause the first computer to function as:
      an imaging unit configured to capture an image; and
      a detecting unit configured to detect a predetermined object from the image captured by the imaging unit, and
   the computer apparatus comprises a second computer including second instructions that, when executed by the second computer, cause the second computer to function as:
      a determining unit configured to determine whether a time when the image is captured by the imaging unit is included in a set period; and
      a controlling unit configured to control execution of processing relating to the predetermined object detected by the detecting unit,
   wherein if the determining unit determines that a time when a first image is captured by the imaging unit is included in the set period and the detecting unit detects the predetermined object from the first image, the controlling unit controls, based on a position of the predetermined object detected from the first image, the execution of the processing relating to the predetermined object detected from a second image captured by the imaging unit within a period different from the set period.

* * * * *